US006712336B1

(12) United States Patent
Crawford

(10) Patent No.: US 6,712,336 B1
(45) Date of Patent: Mar. 30, 2004

(54) APPARATUS AND METHOD FOR USE IN HANDLING A LOAD

(75) Inventor: Alexander Charles Crawford, Fife (GB)

(73) Assignee: Deep Tek Limited, Newport-on-Tay (GB)

(*) Notice: Subject to any disclaimer, the term of this patent is extended or adjusted under 35 U.S.C. 154(b) by 0 days.

(21) Appl. No.: 10/089,643

(22) PCT Filed: Oct. 3, 2000

(86) PCT No.: PCT/GB00/03769

§ 371 (c)(1),
(2), (4) Date: Mar. 28, 2002

(87) PCT Pub. No.: WO01/25130

PCT Pub. Date: Apr. 12, 2001

(30) Foreign Application Priority Data

Oct. 5, 1999 (GB) ............................................ 9923345

(51) Int. Cl.$^7$ .......................... B66D 1/00; H02G 11/00; B65H 75/38

(52) U.S. Cl. ................. 254/266; 191/12.2 R; 242/406; 414/918

(58) Field of Search .......................... 254/134.352, 266; 242/406; 191/12 R, 12.2 R, 12.4; 414/918; 212/271, 239, 238, 240, 243, 251, 332; 294/65.5, 64.1

(56) References Cited

U.S. PATENT DOCUMENTS 6,267,356 B1 * 7/2001 Crawford .................... 254/266

FOREIGN PATENT DOCUMENTS

| | | |
|---|---|---|
| DE | 19820037 | 11/1999 |
| EP | WO 9622935 | 8/1996 |

* cited by examiner

*Primary Examiner*—Kathy Matecki
*Assistant Examiner*—Evan Langdon
(74) *Attorney, Agent, or Firm*—Drinker Biddle & Reath LLP

(57) ABSTRACT

An improvement to lifting devices where a service cable 1 and hoist rope 2 are wound around one another, wherein the load-bearing rope 2 is wound around the cable 1 that is paid off from a cable winch 13 so that when the wound cable and rope 2 leave the device, the higher tension on the rope pulls that into an axial configuration with the service cable 1 helically coiled around it.

32 Claims, 9 Drawing Sheets

APPARATUS AND METHOD FOR USE IN HANDLING A LOAD

This Application is the U.S. National Phase Application of PCT International Application No PCT/GB00/03344 filed Sep. 1, 2000. This invention relates to apparatus for use in handling a load which is capable of raising and lowering, or of towing, a load and also handling service cables and/or hoses connected to the load. The invention is particularly, but not exclusively, applicable to the handling of subsea equipment such as grabs.

DESCRIPTION OF THE RELATED ART

Hitherto, providing services to underwater equipment has required the provision of a specific bundle of cable(s) and/or hose(s) dedicated to each application. For some applications, it is known to incorporate the service bundle within an armoured hoist rope. This approach has a number of deficiencies. The resulting rope is costly, gives inferior hoisting properties, and by virtue of limitations on the diameter of rope which can be handled the services which can be incorporated are limited. Further, in practice it is impossible with this arrangement to add to the length of the rope or to join different types of materials, for example wire ropes with fibre ropes.

BRIEF SUMMARY OF THE INVENTION

In accordance with an aspect of the present invention, apparatus for use in handling a load comprises a load-bearing rope, a mechanism for paying out and recovering the rope, a mechanism for holding a and paying out a service cable, and a wrapping device for rotating said rope around the service cable as the cable is payed out to wrap the rope around the service cable, and to unwrap one from the other as either of them is recovered.

In accordance with another aspect of the present invention, a method of handling a load comprises paying out a service cable and wrapping a load-bearing rope around the service cable as it is payed out, and subsequently unwrapping one from the other as either of them is recovered.

Winding the load-bearing rope around the cable as it is paid off from a static cable winch allows use of large diameter cables. When the wound cable and rope leave the device, the higher tension on the rope pulls that into an axial configuration with the service cable helically coiled around it, ensuring that the load is then borne by the rope and not the cable.

The term “service cable” is used herein to denote a flexible elongate member used for conveying power or data, such as an electrical cable, a fibre optic cable, or a pneumatic or hydraulic hose.

Preferably, the rope is wrapped helically around the service cable as it is being paid out. The rope and the service cable are preferably both tensioned when being paid out, and the tension typically applied to the load-bearing rope is typically higher than the tension applied to the service cable.

As the rope and service cable leave the apparatus the higher load on the rope wrapped around the service cable straightens the service cable and wraps the service cable helically around the rope. This allows larger diameter service cables to be used with any type of load-bearing rope without modifications to the winding apparatus used for winding the rope around the axial service cable. Therefore, the service cable can be paid out from a large drum on a static main winch of the device rather than needing to be mounted on a drum of fixed size which is arranged to rotate around an axis, thereby reducing the limitations on the diameter and length of the service cable to be paid out. Also, the service cable on the main winch can be connected to the services as it is being paid out, thereby allowing services to be provided as the load is lowered or raised, e.g. electricity can be supplied to an ROV without disconnection of supply in order to change reels of service cable. In contrast the rope can be dispensed from the service cable and joined to additional lengths of rope as required, again without disrupting the provision of services to the load.

The drum for paying out the rope is typically arranged such that the rope leaves the drum at or close to the axis of the cable so that the rope does not exert sideways force on the cable. Rollers or other such devices can be used to deflect the cable momentarily from the axis to allow the rope to be paid out along or close to the axis.

Typically, the load-bearing rope will be a hoist rope used for raising and lowering a load. Alternatively, the load-bearing rope may be a towing rope used for paying out, towing and recovering a load such as a marine sensor array.

The apparatus may include a plurality of service cables each extending from a respective drum.

The rope is preferably paid out from a drum arranged to rotate around the axis of the service cable.

Preferably, the mechanism for paying out and recovering the service cable comprises a cable winch, from which the cable passes over a cable sheave and thereafter may extend to the load along a substantially straight axis.

The wrapping device may comprise the rope drum being arranged for rotation about a drum axis which coincides with the axis of the service cable, the drum typically having a central aperture through which the service cable passes, the rope preferably passing over a rope sheave which is mounted for movement in a circular path around said axis.

Alternatively, the rope drum may be rotatable on a structural member that is arranged for movement in a circular path about said axis.

Alternatively the rope drum may be static and a winding device can rotate around it to pay out the rope.

The service cable winch, the rope drum, and the wrapping device may conveniently each have a respective driving motor; they could however be driven by a single source through appropriate mechanical linkages.

Certain embodiments are likely to be useful when a large diameter or heavy signal/power is used and it is more convenient to store the cable on a large winch cable bin, or flaked out in lengths and subsequently joined. Smaller load bearing ropes can be stored on the mechanism, and can also be used for hoses and telecommunications cables.

The hoist rope winch is rotated around the central signal/power cable in order to twist the cable and the rope together as they are paid out and rotated in the opposite direction to untwist them as the load is hoisted. Because the weight is on the hoist rope the result will have the appearance of the signal/power cable being wound around the hoist rope.

The hoist rope winch drum may be placed near the centre in order that the rope is paid out close to the centre line and double tapered rollers may be used to deflect the signal/power cable to one side in order to assist in maintaining the hoist rope near the centre.

In other embodiments the hoist rope winch is turned in combination with a rotating arm which may support spooling gear. This arm rotates around the central signal/power cable in order to twist the two cables together as they are paid out and rotated in the opposite direction to untwist the cables as they are hoisted.

The rotating arm may have guide sheaves to position the hoist rope near the centre and attached to these may be double tapered rollers to deflect the signal/power cable to one side in order to assist in maintaining the hoist rope in the centre.

One or more additional ropes can be provided, each with a respective rope drum and sheave arranged to rotate around the axis of the service cable if desired. Alternatively, other service cables can be wound around the main service cable in a similar manner to the hoist rope sheave.

BRIEF DESCRIPTION OF THE SEVERAL VIEWS OF THE DRAWINGS

Examples of apparatus and a method for use in handling a load in accordance with the invention will now be described with reference to the drawings, in which:Page

DETAILED DESCRIPTION OF THE INVENTION

Figure 1:
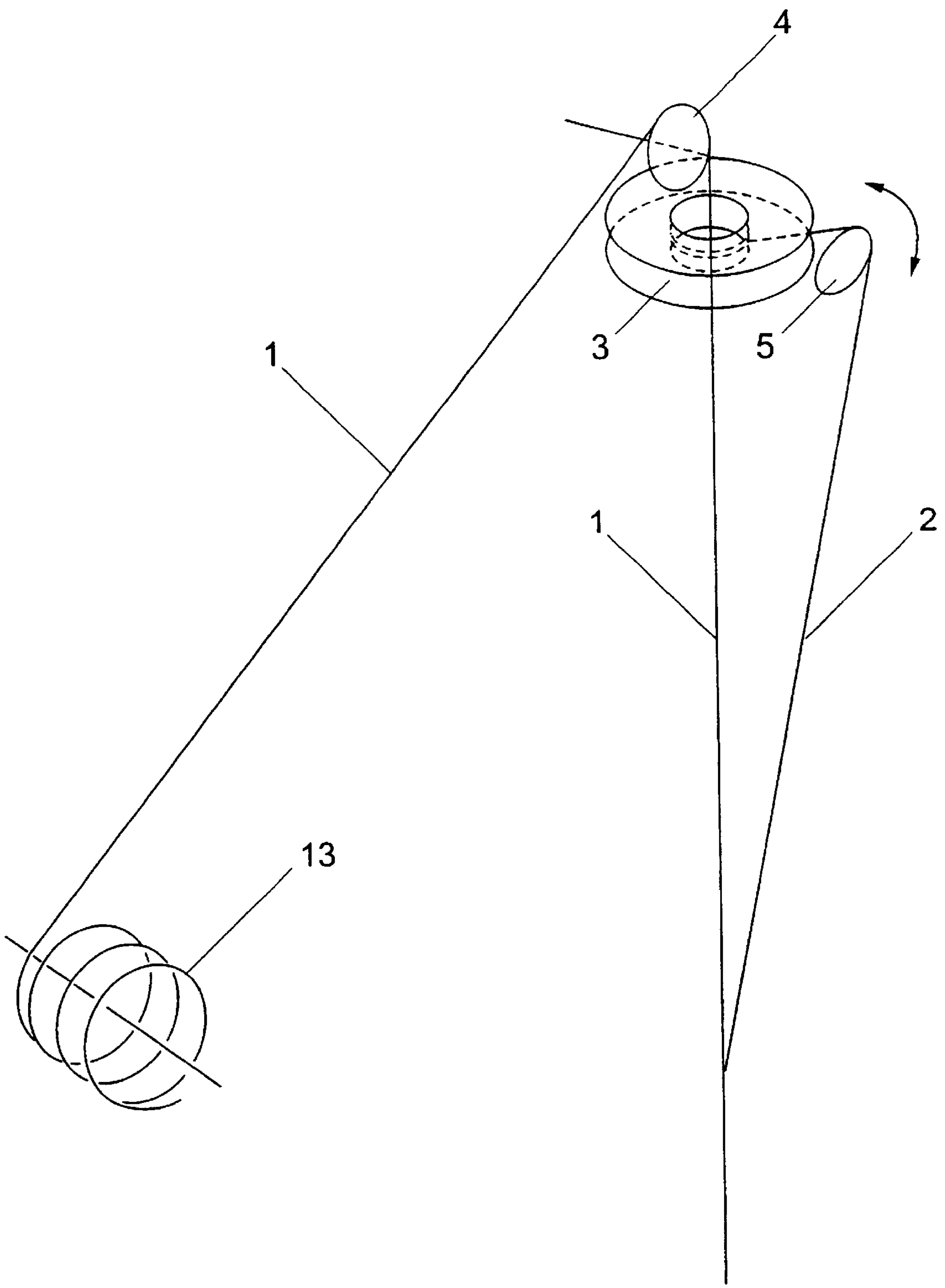
FIG. 1 is a schematic perspective view illustrating the principle of operation of a first example of the invention.

Referring to FIG. 1, an electrical power or cable 1 extends from a cable winch 13 over a cable sheave 4 to supply power to eg an ROV etc (not shown). A hoist rope 2 is reeled on a rope drum 3 and extends to the load via a rope sheave 5. The hoist rope 1 may be any suitable form of hoist rope such as flexible steel wire rope or synthetic fibre rope, for example of "Kevlar".

The service cable 1 passes through a central aperture of the hoist rope drum 3, and the rope sheave 5 is arranged to be driven circumferentially around the axis of the service cable 1. By co-ordinating the movements of the cable winch 13, the rope drum 3 and the rope sheave 5, the hoist rope 2 can be wrapped helically around the cable 1 to lower the load, and unwrapped as the load is raised. In this way, a hoist rope of any desired properties can be used in combination with any required service connection.

Figure 2:
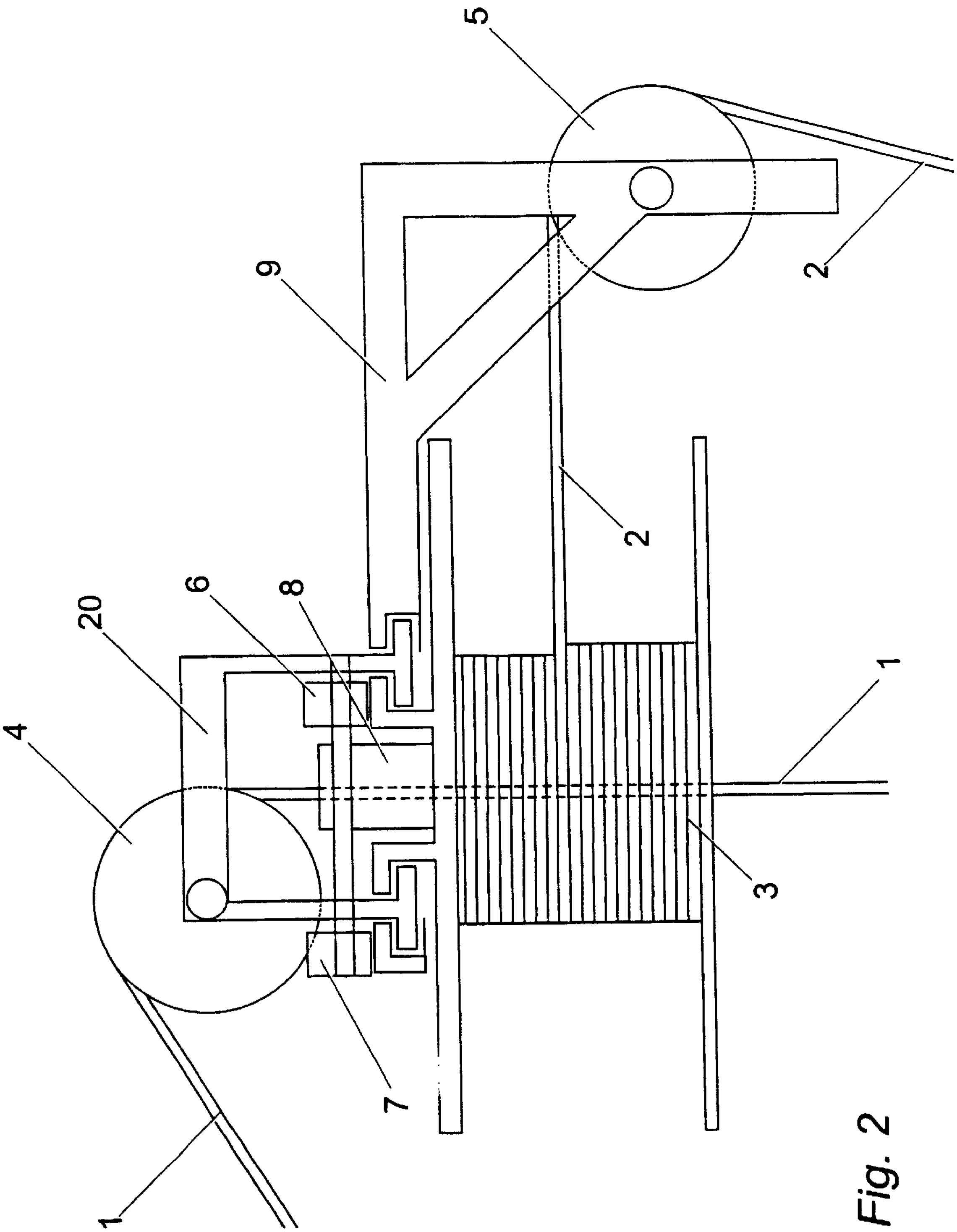
FIG. 2 is a more detailed side view, partly in section, of an apparatus used in the example of FIG. 1.

FIG. 2 shows the rope drum 3 and associated parts in greater detail. The cable sheave 4 is journalled to a fixed frame 20 that is secured to any suitable supporting structure (not shown). The rope drum 3 is rotatably mounted on the lower part of the frame 20 and driven in rotation by a motor 6.

The inner end of the rope 2 can be connected to any appropriate service if needed by any convenient means (not shown) but is otherwise connected to the winch drum 3.

The rope sheave 5 is journalled on a mounting frame 9 that is rotatable about the fixed frame 20 by means of a motor 7.

The motors 6 and 7 are driven at speeds related to the axial speed of payout of the cable 1. The speed correlation may be fixed. Preferably, however, this correlation will be controllable to alter both the length of twist (pitch) of the lay of the rope 2 on the cable 1, and the tension in each.

Figure 3:
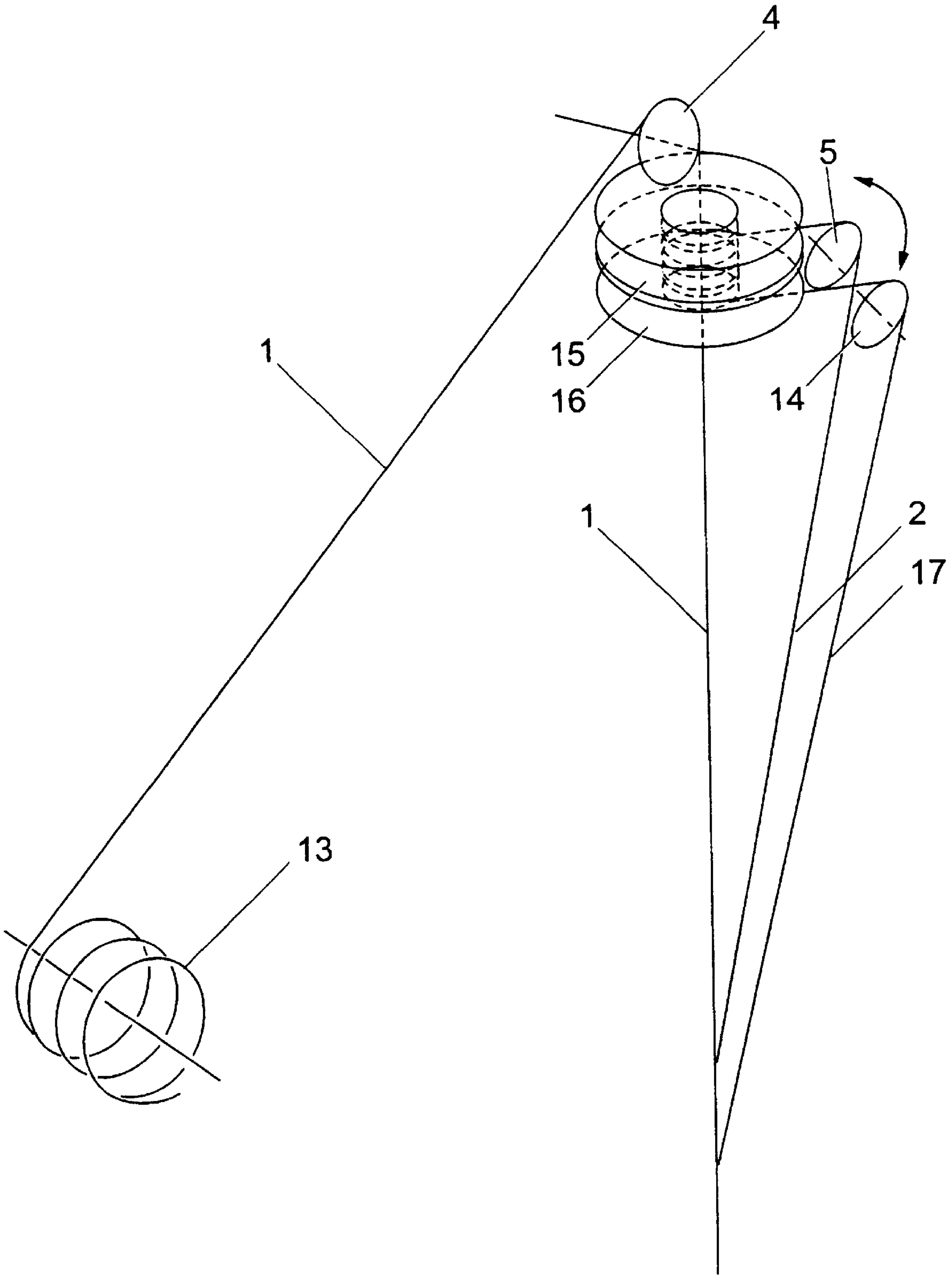
FIG. 3 is a view similar to FIG. 1 illustrating a modification of the arrangement of FIG. 1.

FIG. 3 shows a modification in which a second service cable 17 is wrapped on the first cable 1 along with the hoist rope 2. In this modification, the service cable 17 is provided with a cable storage drum 16 and a cable sheave 14 which may suitably be carried on a common supporting frame for rotation in unison with the hoist rope sheave 5 around the rope drum 15.

The apparatus may be further modified by adding further drums and sheaves to handle more services or hoist ropes.

Figure 4:
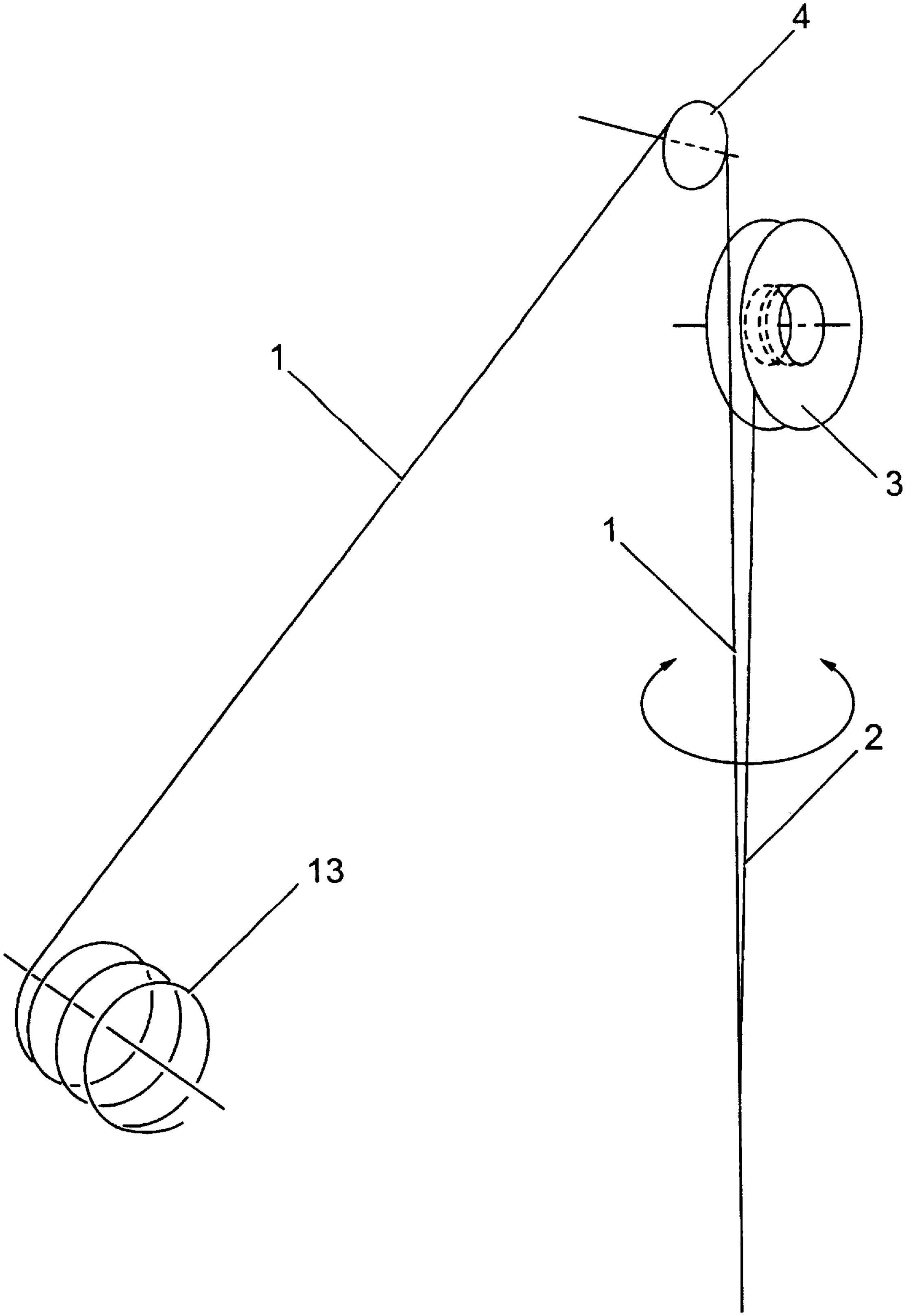
FIG. 4 is a schematic perspective view illustrating a second example of the invention.

FIG. 4 illustrates a second example in which the rope 2 is reeled on a drum 3 and the drum 3 is itself rotated about the service cable 1 to achieve a helical wrap and unwrap. As shown in more detail in FIG. 5, the rope drum 3 may be constituted by a drum 12 removably mounted on a hub motor 11 which is carried on the end of an arm 18 rotatably mounted on the fixed frame 20 and driven by a motor 10.

Figure 5:
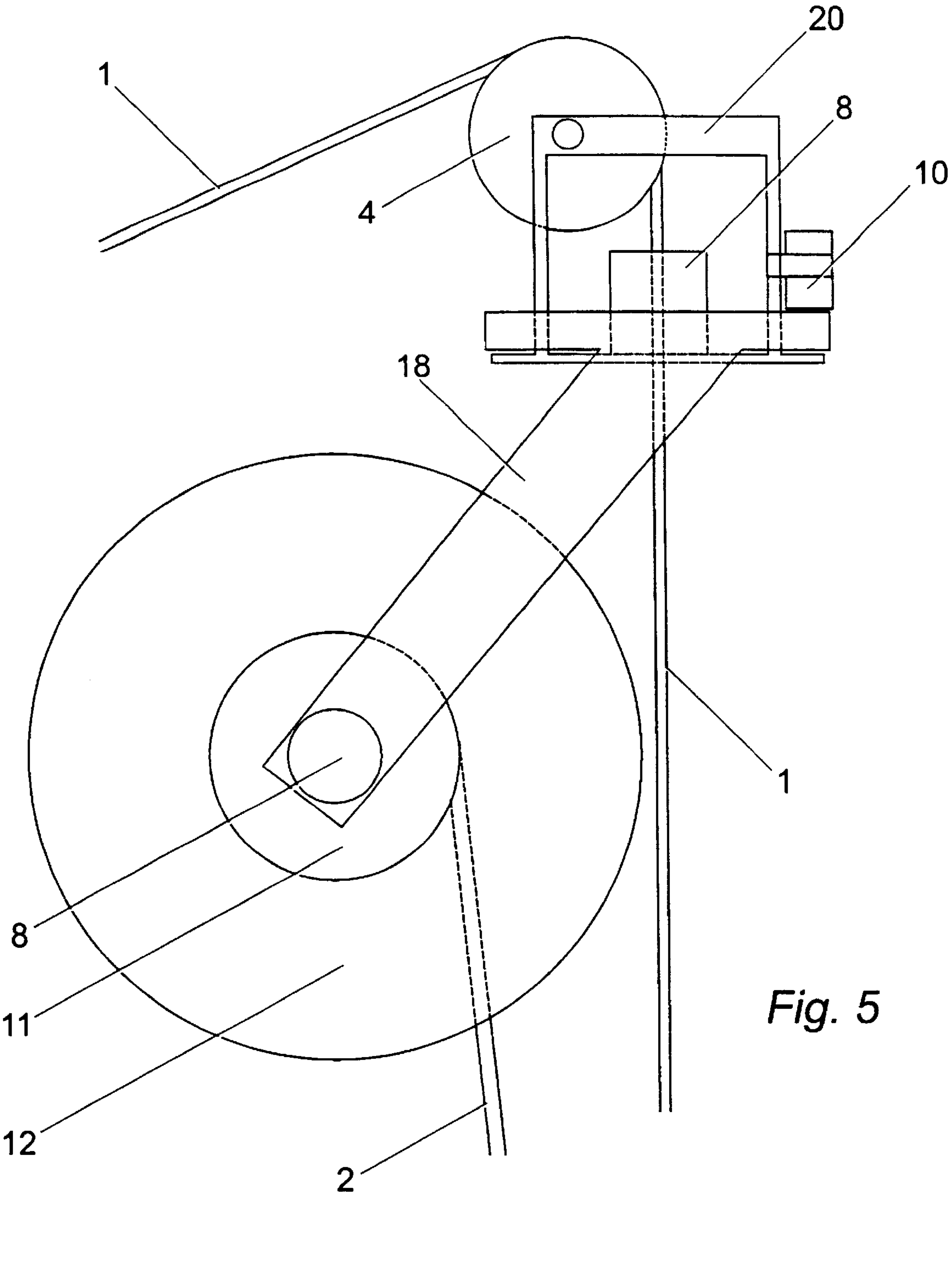
FIG. 5 is a side view of an apparatus used in the example of FIG. 4.

As with the first example, the example shown in FIGS. 4 and 5 could be modified by adding further service cable drums to be rotated by the motor 10.

Figure 6:
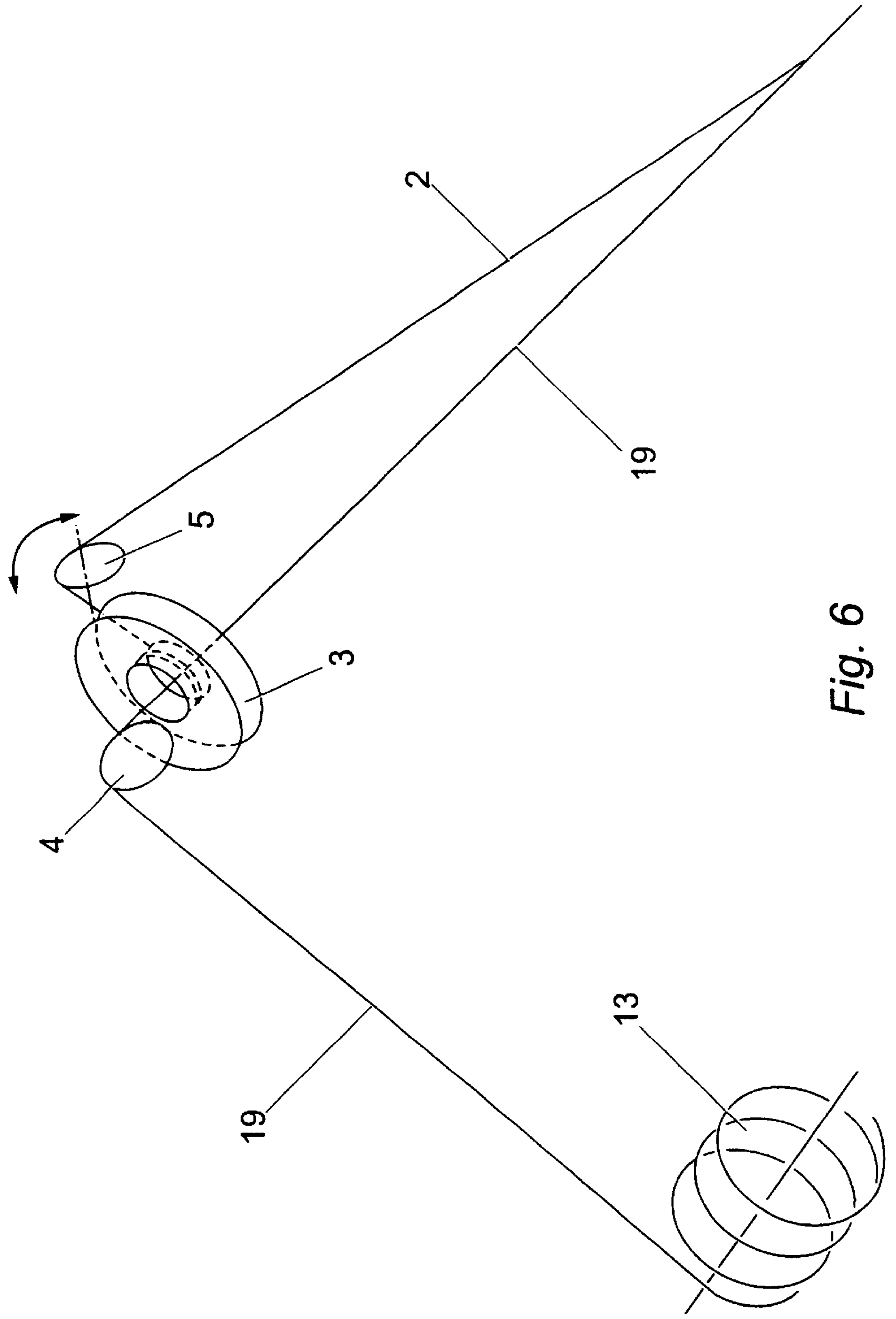
FIG. 6 is a schematic perspective view illustrating a third example similar to that of FIG. 1 but modified for towing rather than lifting.
Figure 7:
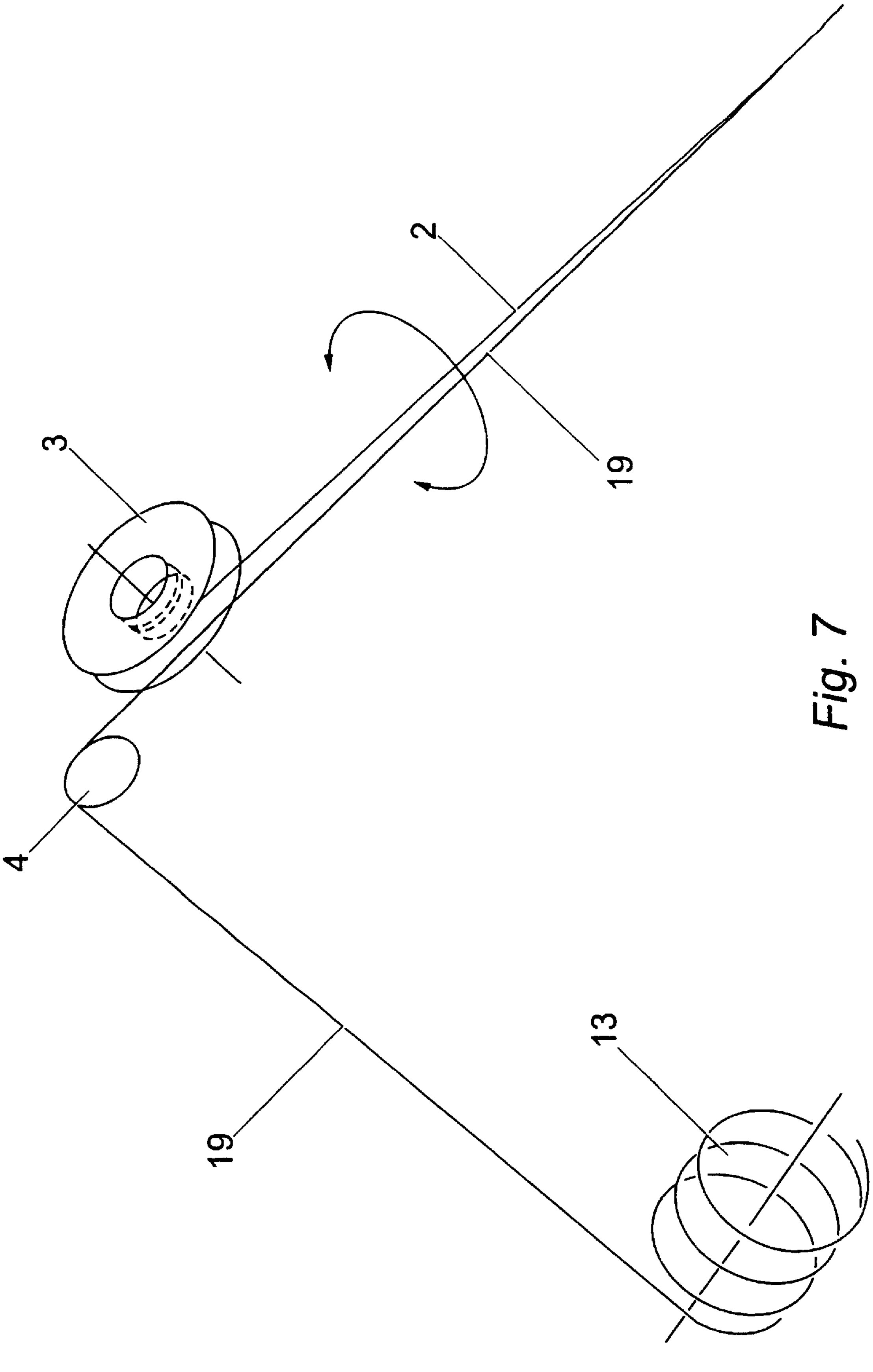
FIG. 7 illustrates a fourth example similar to that of FIG. 4 but modified for towing rather than lifting.

FIG. 6 illustrates the example of FIG. 1 modified for use in a marine towing application, for example in paying out, towing and recovering a sensor array such as a sonar sensor or seismographic surveying sensor, the sensor array being towed underwater or on the surface. The rope drum 3 is hinged to the main structure of the towing vessel (not shown) and can be tilted to a desired towing angle by hydraulic or other mechanisms. Likewise, FIG. 7 illustrates the modification of the example of FIG. 4 for the same use, the frame carrying the mounting arm for the rope drum 3 being hinged to the vessel and tilted to the desired angle by hydraulic or other mechanisms.

The invention may be applied to a system in which one or more service cables is applied to a load-bearing rope which itself carries a service channel in addition to fulfilling its load-bearing function. For example, the load-bearing rope could be a steel wire rope carrying electrical signals, or a rope comprising "Kevlar" load-bearing strands in combination with optical fibre cable.

Figure 8:
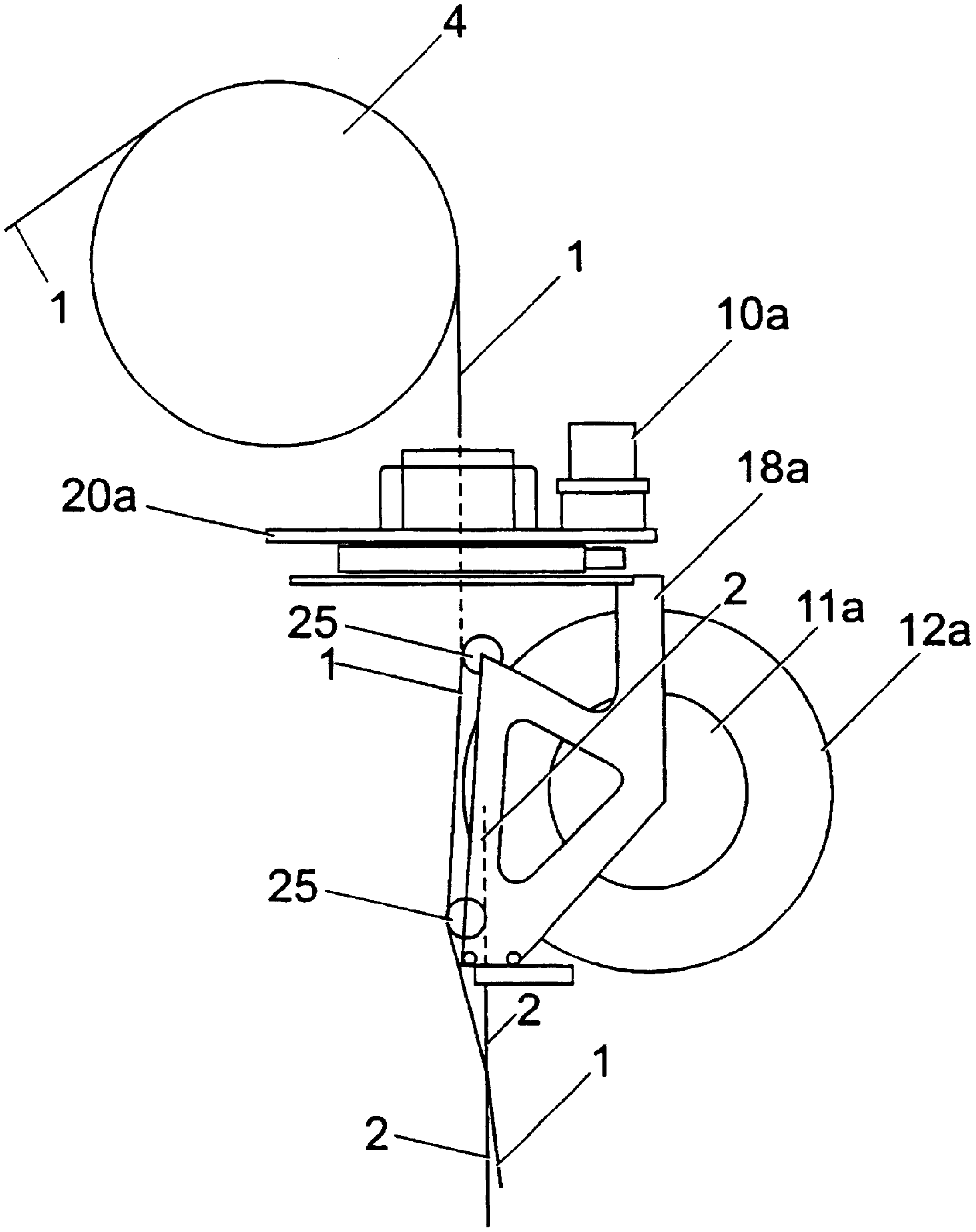
FIGS. 8 and 9 show further embodiments.

FIG. 8 shows another embodiment having a signal/power cable 1 passing over a cable sheave 4 on an axial path to a load (not shown). The rope 2 is held on a rope drum 12*a* that is mounted in a hub motor 11*a* and carried on an arm 18*a* rotatably mounted on a frame 20*a* and driven by a motor 10*a*. The rope 2 spools over the top of the drum 12*a* so that it is paid out close to the axis of the cable 1.

The arm 18*a* has a pair of double tapered rollers 25, which deflect the path of the cable 1 from its axis to make way for the rope 2 to extend axially downwards to the load. The greater tension is applied to the rope 2 and although before convergence of the cable 1 and the rope 2 the rope 2 is wrapped around the cable 1, after the rope leaves the drum 12*a* the high load pulls it axially straight down and this forces the cable 1 into a helical wrap around the outer surface of the rope 2.

Figure 9:
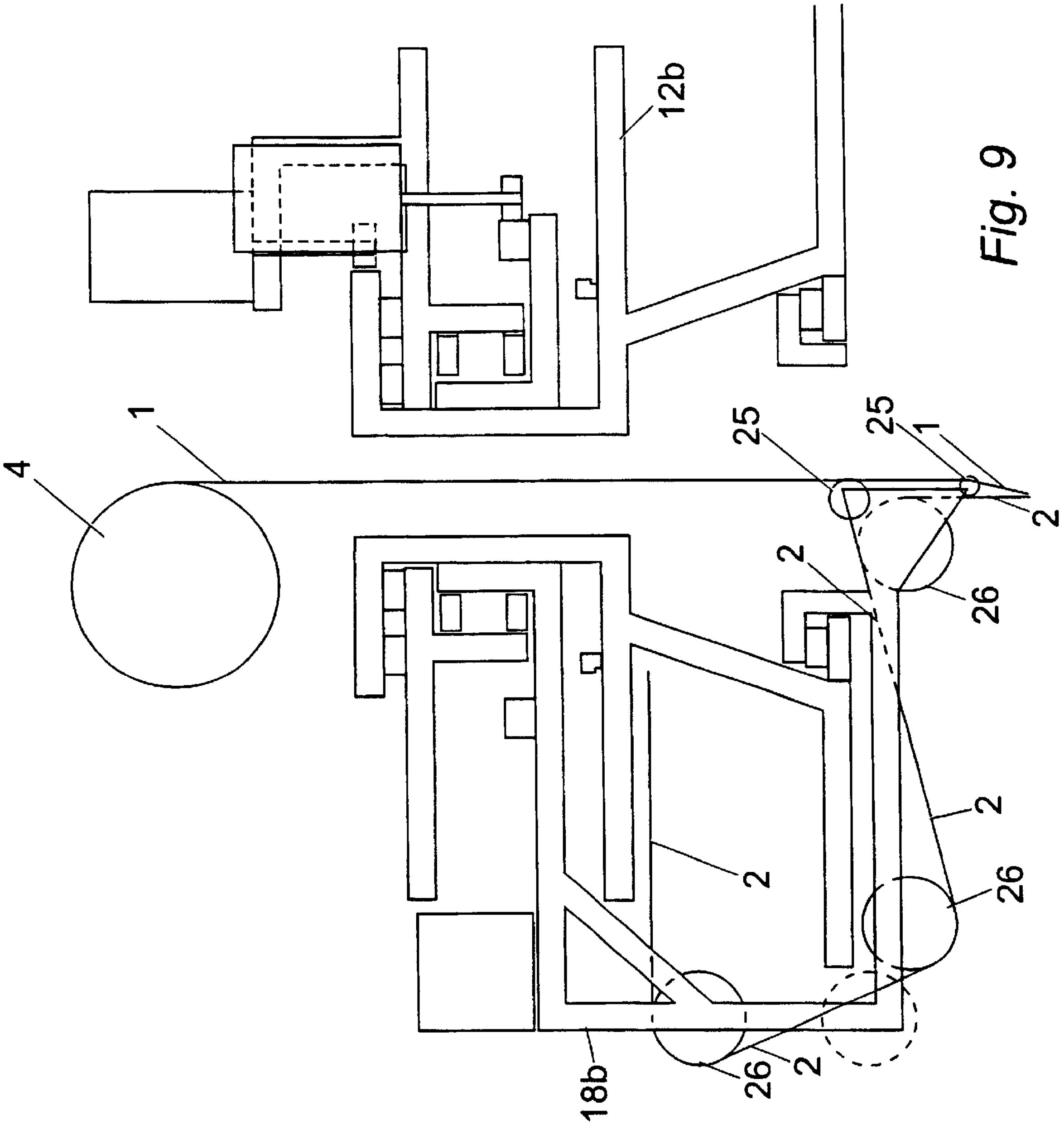

In the FIG. 9 embodiment the rope 2 is held on a drum 12*b* having an axial aperture through which the cable 1 extends from the cable sheave 4. The rope drum 12*b* is held stationary and a winch in the form of a rotating arm 18*b* spools off the rope 1 in one direction from the drum 12*b*. The arm 18*b* has spooling rollers, pulleys or guide sheaves 26 which guide the path of the rope 2 around the lip of the drum

12*b* and over the axis of its rotation above the load. The rope 2 is thereby twisted around the cable 1 as it is paid out and the arm 18*b* rotates in the opposite direction to wind it back in. The apparatus may have double tapered rollers 25 to deflect the path of the cable 1 as previously described. In various modifications the drum 12*b* may wind in or out.

Other modifications may be made within the scope of the invention.

What is claimed is:

1. A method of handling a load comprising providing a load-bearing rope and a service cable, holding and paying out the service cable and wrapping the load-bearing rope around the service cable by rotating the rope around the service cable as the service cable is paid out, and subsequently unwrapping one from the other as either of them is recovered.

2. A method as claimed in claim 1, wherein the service cable comprises at least one of the group consisting of an electrical cable, a fibre optic cable, a pneumatic hose and a hydraulic hose.

3. A method as claimed in claim 1, wherein the rope is helically wrapped around the axis of the service cable as it is being paid out.

4. A method as claimed in claim 1, wherein the rope and the service cable are each tensioned when being paid out.

5. A method as claimed in claim 4, wherein the tension applied to the load-bearing rope is higher than the tension applied to the service cable.

6. A method as claimed in claim 1, wherein the service cable is paid out from a static winch.

7. A method as claimed in claim 1, wherein a drum is used for paying out the rope, and is arranged such that the rope leaves the drum at or close to the axis of the cable.

8. A method as claimed in claim 1, wherein the service cable is deflected from its axis to allow the rope to be paid out along or close to the axis.

9. A method as claimed in claim 1, wherein the load-bearing rope is a hoist rope used for raising and lowering a load.

10. A method as claimed in claim 1, wherein the load-bearing rope is a towing rope used for paying out, towing and recovering a load.

11. A method as claimed in claim 1, wherein more than one service cable is paid out.

12. A method as claimed in claim 1, wherein the rope is paid out from a member that can move in a circular path about the service cable.

13. A method as claimed in claim 1, wherein the rope is paid out from a winding device rotating around a static rope drum.

14. A method as claimed in claim 1, wherein the rope is paid out from a drum capable of rotating around the axis of the service cable.

15. A method as claimed in claim 1, wherein the mechanism for paying out and recovering the service cable comprises a cable winch, from which the cable passes over a cable sheave and thereafter extends to the load along a substantially straight axis.

16. Apparatus for use in handling a load comprising a load-bearing rope, mechanism for paying out and recovering the rope, a mechanism for holding and paying out a service cable, and a wrapping device for rotating said rope around the service cable as the cable is payed out to wrap the rope around the service cable, and to unwrap one from the other as either of them is recovered.

17. Apparatus as claimed in claim 16, wherein the mechanism for paying out and recovering the rope comprises a rope drum.

18. Apparatus as claimed in claim 16, wherein mechanism for paying out and recovering the rope is arranged for movement in a circular path about the axis of the service cable.

19. Apparatus as claimed in claim 16, wherein the mechanism for paying out and recovering the rope is static and a winding device rotates around it to pay out the rope.

20. Apparatus as claimed in claim 17, wherein the rope drum can rotate about its axis.

21. Apparatus as claimed in claim 17, wherein the rope drum has an axis which coincides with the axis of the service cable, the drum typically having a central aperture through which the service cable passes, the rope passing over a rope sheave which is mounted for movement in a circular path around the axis of the service cable.

22. Apparatus as claimed in claim 16, wherein the mechanism for holding and paying out a service cable, the mechanism for paying out and recovering the rope, and the wrapping device each have a respective driving motor.

23. Apparatus as claimed in claim 16, wherein the rope is paid out close to the axis of the service cable.

24. Apparatus as claimed in claim 16, having at least one roller adapted to deflect the service cable from its axis.

25. Apparatus as claimed in claim 16, having a rotating arm adapted to pay out the load-bearing rope.

26. Apparatus as claimed in claim 25, having a spooling gear on the arm.

27. Apparatus as claimed in claim 25 wherein the arm is adapted to rotate around the service cable.

28. Apparatus as claimed in claim 25, wherein the rotating arm has a guide sheave adapted to position the load-bearing rope near the axis of the service cable.

29. Apparatus as claimed in claim 16, wherein the service cable comprises at least one of the group consisting of an electrical cable, a fibre optic cable, a pneumatic cable and a hydraulic hose.

30. Apparatus as claimed in claim 16, wherein the load-bearing rope is a hoist rope used for raising and lowering a load.

31. Apparatus as claimed in claim 16, wherein the load-bearing rope is a towing rope used for paying out, towing and recovering a load.

32. Apparatus as claimed in claim 16, wherein more than one service cable is provided.

* * * * *